(12) United States Patent
Spicer et al.

(10) Patent No.: US 10,533,334 B2
(45) Date of Patent: Jan. 14, 2020

(54) COVER FOR A SPA AND METHOD OF MANUFACTURING A COVER

(71) Applicants: Wade Spicer, Northumberland, PA (US); Charles Woods, West Manchester, OH (US)

(72) Inventors: Wade Spicer, Northumberland, PA (US); Charles Woods, West Manchester, OH (US)

( * ) Notice: Subject to any disclaimer, the term of this patent is extended or adjusted under 35 U.S.C. 154(b) by 0 days.

(21) Appl. No.: 15/450,107

(22) Filed: Mar. 6, 2017

(65) Prior Publication Data
US 2017/0260765 A1     Sep. 14, 2017

Related U.S. Application Data

(60) Provisional application No. 62/306,970, filed on Mar. 11, 2016.

(51) Int. Cl.
| E04H 4/08 | (2006.01) |
| B29C 44/12 | (2006.01) |
| B29C 69/02 | (2006.01) |
| B29C 51/10 | (2006.01) |
| B29K 25/00 | (2006.01) |
| B29K 75/00 | (2006.01) |
| B29K 105/04 | (2006.01) |

(Continued)

(52) U.S. Cl.
CPC ............ *E04H 4/08* (2013.01); *B29C 44/1228* (2013.01); *B29C 44/1233* (2013.01); *B29C 51/10* (2013.01); *B29C 69/02* (2013.01); *B29K 2025/06* (2013.01); *B29K 2075/00* (2013.01); *B29K 2105/046* (2013.01); *B29K 2627/06* (2013.01); *B29K 2995/0063* (2013.01); *B29L 2009/00* (2013.01); *B29L 2031/769* (2013.01)

(58) Field of Classification Search
CPC ....... E04H 4/08; B29C 44/1228; B29C 51/10; B29C 69/02; B29L 2009/00; B29L 2031/769
USPC ............................................................ 4/498
See application file for complete search history.

(56) References Cited

U.S. PATENT DOCUMENTS

| 4,376,082 A * | 3/1983 | Heck ...................... F24F 13/20 165/135 |
| 4,660,545 A | 4/1987 | Ely |

(Continued)

FOREIGN PATENT DOCUMENTS

| CA | 2298306 | 1/2001 |
| EP | 3020890 | 5/2016 |
| WO | WO-2015114386 A1 * | 8/2015 ............. E06B 1/702 |

OTHER PUBLICATIONS

"Nonadhesive" Merriam-Webster.com. Merriam-Webster, May 13, 2019 (Year: 2019).*

(Continued)

*Primary Examiner* — Benjamin R Shaw
(74) *Attorney, Agent, or Firm* — Grogan, Tuccillo & Vanderleeden, LLP

(57) ABSTRACT

A method of manufacturing a cover for a spa includes the steps of vacuum molding a first shell member and a second shell member, bringing the first and second shell members into registration with one another to define a hollow cavity therebetween, and injecting a foam into the hollow cavity, wherein the foam is configured to bond with the shell members to create a unitary structural part that provides increased strength and rigidity.

9 Claims, 19 Drawing Sheets

(51) Int. Cl.
*B29L 9/00* (2006.01)
*B29L 31/00* (2006.01)
*B29K 627/06* (2006.01)

(56) References Cited

U.S. PATENT DOCUMENTS

| | | | | |
|---|---|---|---|---|
| 4,838,038 | A * | 6/1989 | Uecker | F24F 5/0035 |
| | | | | 62/259.4 |
| 5,398,350 | A * | 3/1995 | Watkins | E04H 4/08 |
| | | | | 4/498 |
| 5,509,565 | A * | 4/1996 | Hoffman | F24F 13/20 |
| | | | | 220/378 |
| 5,597,086 | A | 1/1997 | King-Shui | |
| 5,720,407 | A | 2/1998 | Hoffman | |
| 5,974,600 | A * | 11/1999 | Pucci | E04H 4/084 |
| | | | | 4/498 |
| 6,112,340 | A * | 9/2000 | Ziebert | E04H 4/08 |
| | | | | 4/498 |
| 6,295,787 | B1 | 10/2001 | Lee | |
| RE45,479 | E * | 4/2015 | Jones | B65H 3/02 |
| | | | | 220/592.15 |
| 9,493,960 | B2 * | 11/2016 | Spicer | E04H 4/084 |
| 2013/0104307 | A1 | 5/2013 | Genova | |
| 2017/0121992 | A1 * | 5/2017 | Spicer | E04H 4/084 |

OTHER PUBLICATIONS

International Search Report dated May 23, 2017 Based on International Application No. PCT/US17/20857.
Canadian Office Action dated Jun. 20, 2019 in corresponding Canadian Application No. 3,017,124.
European Search Report dated Oct. 16, 2019 in corresponding International Application Serial No. PCT/US2017020857.

* cited by examiner

COVER FOR A SPA AND METHOD OF MANUFACTURING A COVER

CROSS-REFERENCE TO RELATED APPLICATIONS

This application claims the benefit of U.S. Provisional Application Ser. No. 62/306,970, filed on Mar. 11, 2016, which is hereby incorporated by reference herein in its entirety.

FIELD OF THE INVENTION

The present invention relates generally to spas and, more particularly, to a cover for a spa and related method of manufacturing a cover for a spa or hot tub.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage-like effect.

Because many spas/hot tubs are located outdoors, they are often equipped with covers for enclosing the tub when not in use. These covers help prevent dirt, leaves and other debris from entering the water, and provide a safety function by preventing children and animals from falling into the water. Moreover, spa covers are often insulated so as to limit heat loss from the water when the spa is not in use for purposes of energy efficiency and readiness of use.

Both soft and hard covers are known in the art. Typical hard covers generally consist of a hollow plastic shell that can be filled with an insulating foam. These covers typically include internal ribs or columns (also referred to as "kiss offs") that extend between the top shell member and the bottom shell member of the cover to provide structural rigidity and support to the cover. These kiss-offs, while providing rigidity, can degrade the overall insulative benefits of the cover by providing a conductive means for heat to escape the spa to atmosphere.

In connection with the above, typical hard covers for spas may be formed using a variety of molding methods, such as through rotational molding and blow molding. These molding methods, however, require very expensive, custom molds, meaning if a new size or shape cover is desired, a new mold is necessary. Accordingly, this expense has hindered the widespread adoption of hard covers across the spa industry, particularly in view of the sheer number of different sized and shaped spas produced among numerous manufacturers. In addition, existing molding methods do not allow for much variation in the color of the covers produced.

In view of the above, there remains a need for a cover for a spa that has improved insulative properties and structural integrity, and a related method for producing a cover of any size and shape at a reduced cost.

SUMMARY OF THE INVENTION

It is an object of the present invention to provide a cover for a spa.

It is another object of the present invention to provide a cover for a spa that has better insulative properties than existing covers.

It is another object of the present invention to provide a cover for a spa that has improved strength and rigidity as compared to existing covers.

It is another object of the present invention to provide a cover for a spa that has a high quality finish.

It is another object of the present invention to provide a cover for a spa that is easily customizable.

It is another object of the present invention to provide a method of manufacturing a cover for a spa that allows covers of different sizes and shapes to be quickly produced in a cost effective manner.

It is another object of the present invention to provide a method of manufacturing a cover for a spa through which the color of the cover can be easily changed.

These and other objects are achieved by the present invention.

According to an embodiment of the present invention, a method of manufacturing an article for for a spa includes the steps of vacuum molding a first shell member and a second shell member, bringing the first and second shell members into registration with one another to define a hollow cavity therebetween, and disposing a foam within the hollow cavity, wherein the foam is configured to bond with the shell members to create a unitary structural part that provides increased strength and rigidity.

According to another embodiment of the present invention, an article of manufacture, in the form of a cover for a spa, includes a first shell half and a second shell half, wherein the first and second shell halves are both formed from acrylic. The first shell half and the second shell half are joined together to define an interior cavity. The interior cavity is filled with a polyurethane foam that is bonded to the first and second shell halves to form a unitary structural part.

According to yet another embodiment of the present invention, a method of manufacturing a cover for a spa includes the steps of vacuum forming a first shell member from an acrylic material, vacuum forming a second shell member from an acrylic material, bringing the first shell member and the second shell member into nesting relationship to define a hollow interior cavity, and injecting a high density, closed-cell polyurethane foam into the hollow interior cavity, whereby the foam bonds with the first shell member and the second shell member to create an integral structure.

BRIEF DESCRIPTION OF THE DRAWINGS

The present invention will be better understood from reading the following description of non-limiting embodiments, with reference to the attached drawings, wherein below:

FIG. 6 is an exploded, perspective view of a cover for a spa showing the top cover member, bottom cover member and internal foam material.

DETAILED DESCRIPTION OF THE PREFERRED EMBODIMENT

Figure 1:
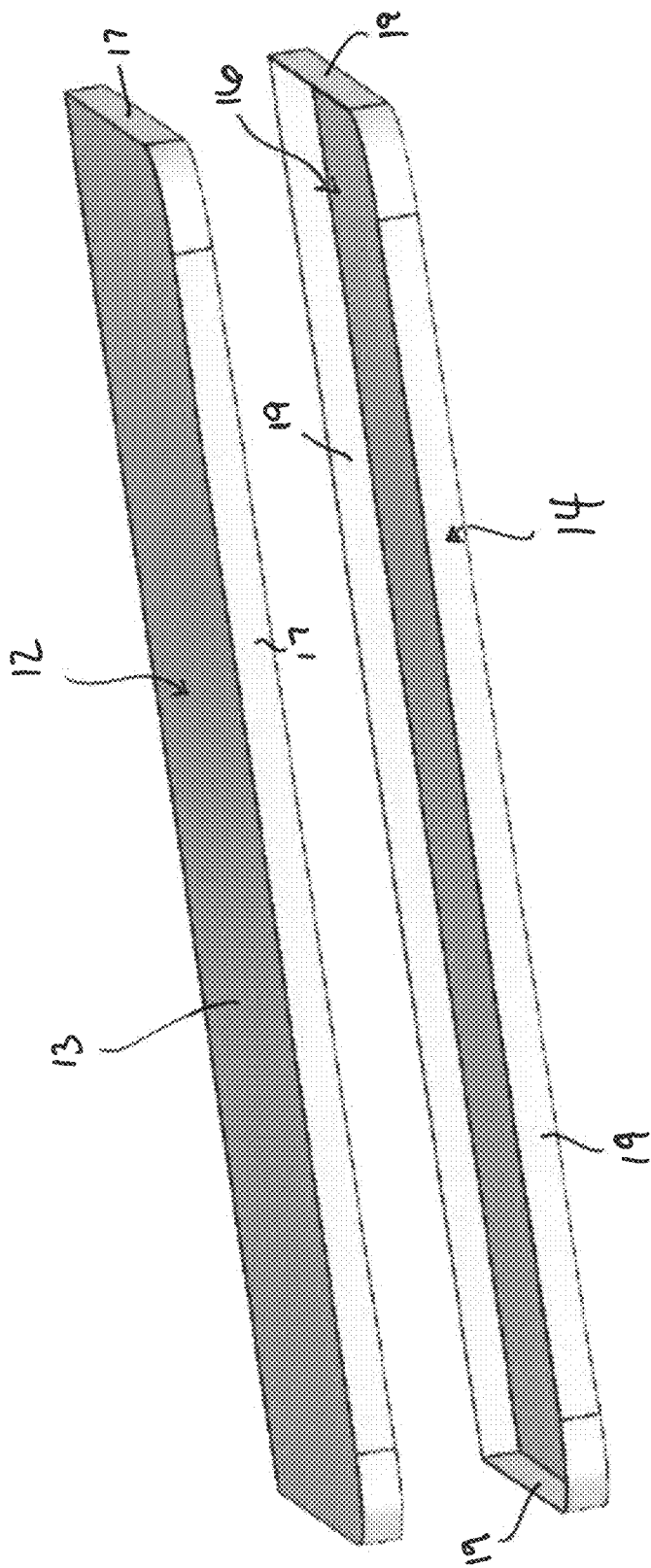
FIG. 1 is a top, perspective view showing the top and bottom halves of a spa cover, according to an embodiment of the present invention.
Figure 2:
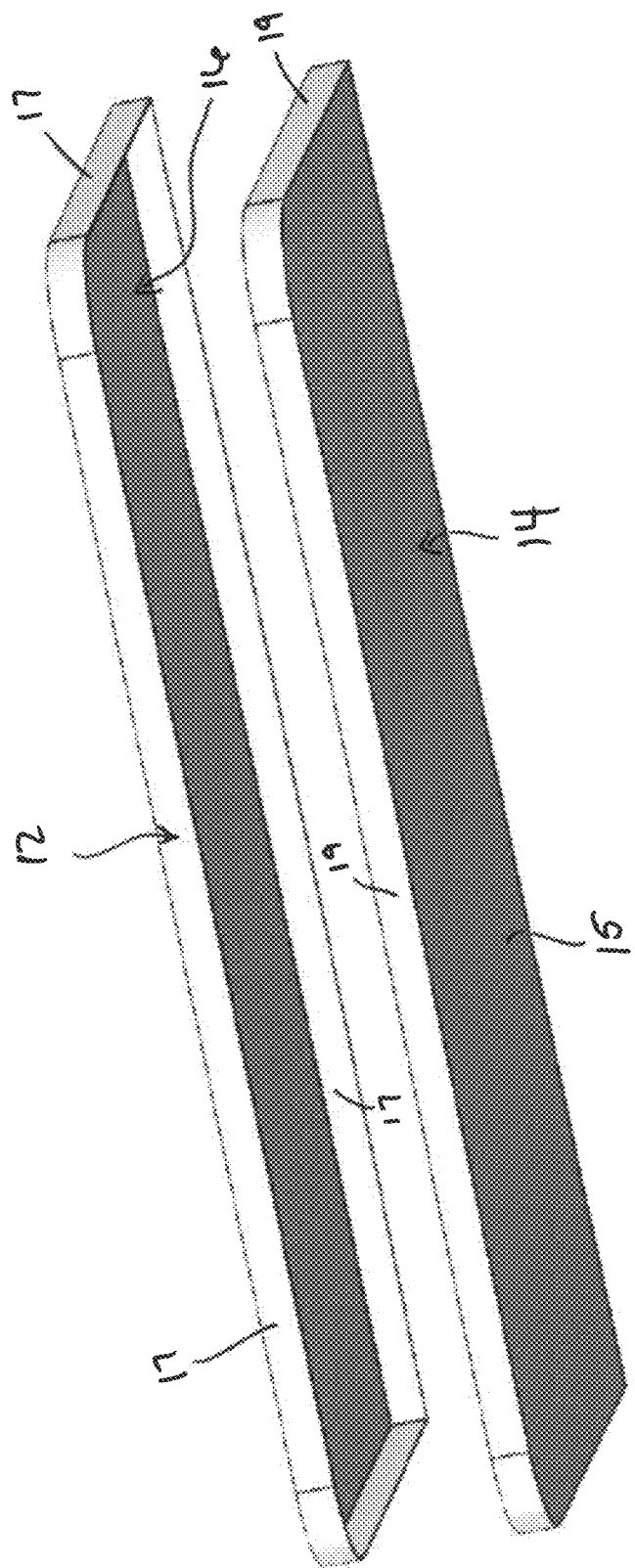
FIG. 2 is a bottom, perspective view showing the top and bottom halves of the spa cover of FIG. 1.

Referring to FIGS. 1-8, a cover assembly 10 for a spa is illustrated. As shown in FIGS. 1 and 2, the cover assembly 10 includes a top shell member 12 and a bottom shell member 14. Each of the shell members 12, 14 is generally rectangular in shape and includes an outer surface (e.g., outer surfaces 13, 15) and peripheral sidewalls (e.g., peripheral sidewalls 17, 19) extending from the outer surface defining therebetween an interior space 16. In an embodiment, the shell members 12, 14 are manufactured utilizing a vacuum molding process (or a pressure forming process). In the preferred embodiment, the shell members 12, 14 are manufactured from an acrylic material. For example, in the preferred embodiment, the shell members 12, 14 may be manufactured from one of acrylonitrile butadiene styrene (ABS) and polyvinyl chloride (PVC). In other embodiments, the shell members 12, 14 may be manufactured from other materials such as, for example, polyethylene (PE), without departing from the broader aspects of the present invention.

Figure 3:
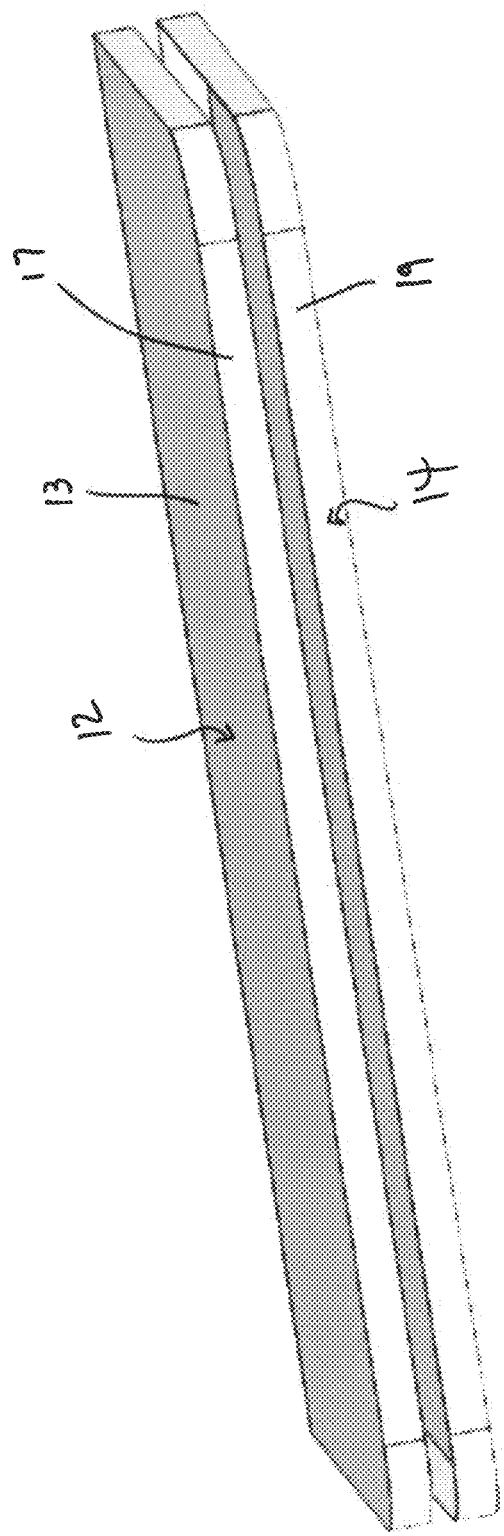
FIG. 3 is a perspective view showing the top and bottom halves being moved into registration with one another.
Figure 4:
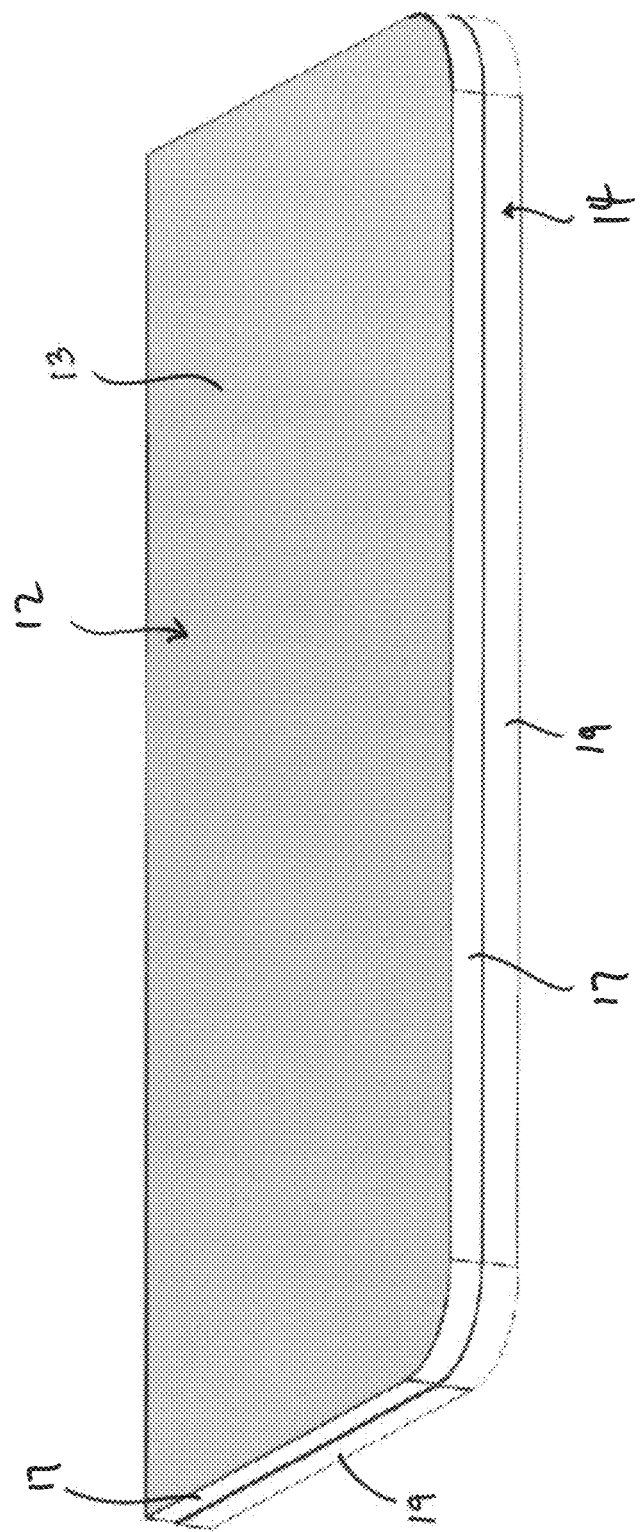
FIG. 4 is another perspective view showing the top and bottom halves being moved closer into registration with one another.
Figure 5:
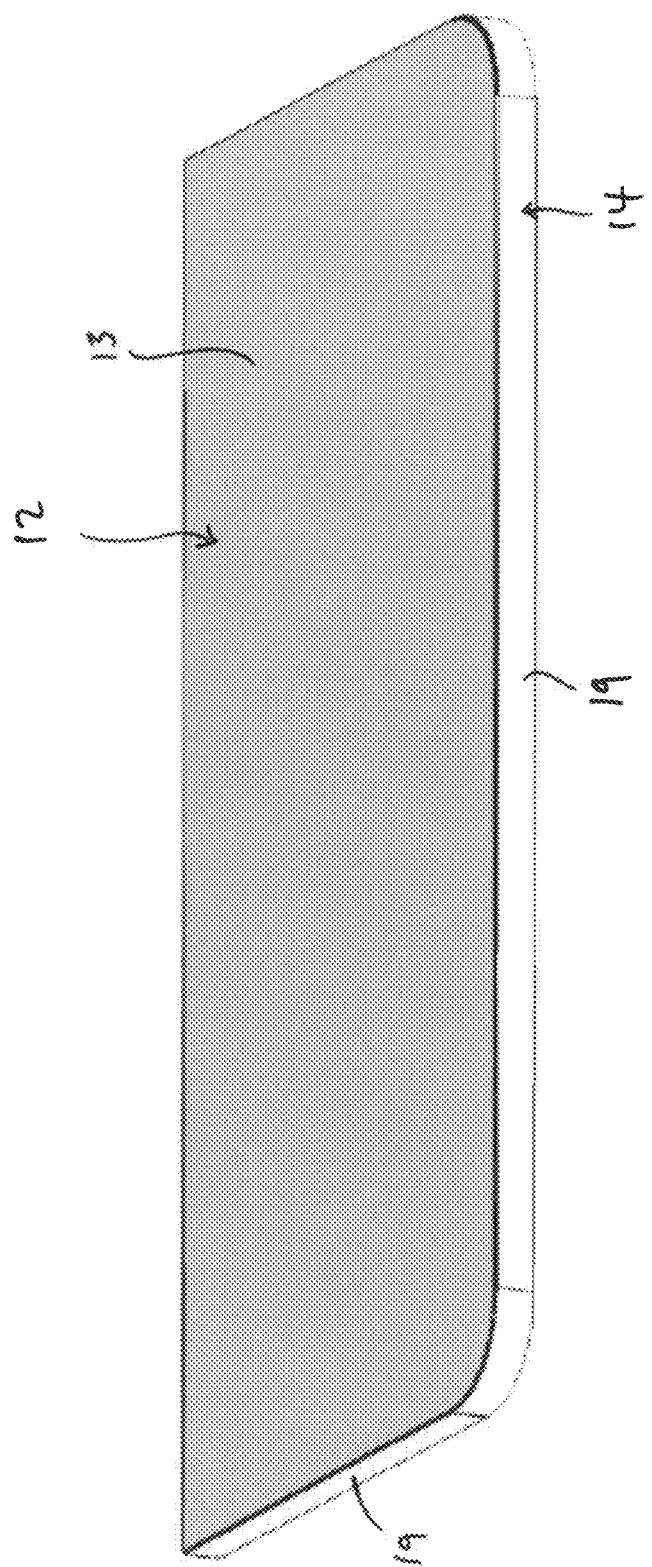
FIG. 5 is a perspective view showing the top and bottom halves in nesting arrangement with one another forming a hollow shell.

As best shown in FIGS. 3-5, once the respective shell members 12, 14 are formed via a vacuum molding process, they are brought into nesting registration with one another to form hollow cavity therebetween. For example, shell member 12 may be received inside shell member 14. The shell members 12, 14 may then be joined to one another using one or more of mechanical joints, adhesive, or welding to form a water-tight seal, as discussed in detail hereinafter.

Figure 7:
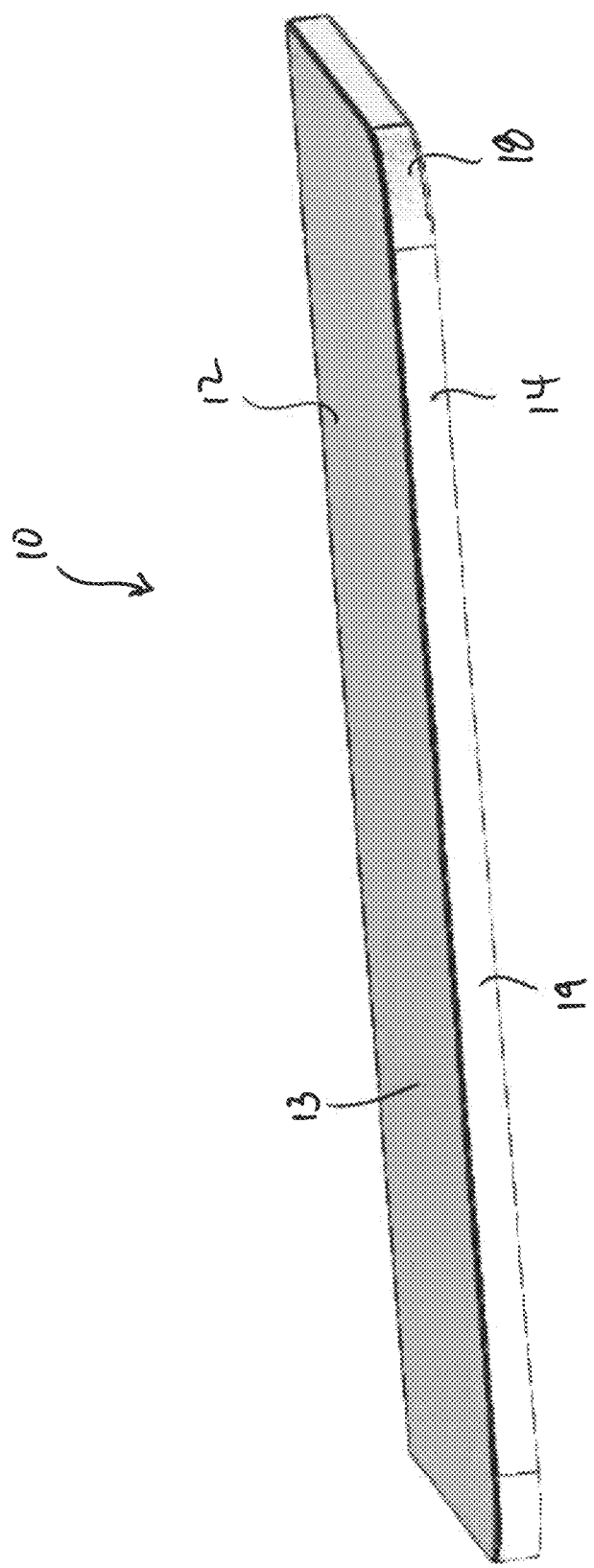
FIG. 7 is a perspective, partial cut-away view of the cover in an assembled state, illustrating the foam interior to the cover.
Figure 8:
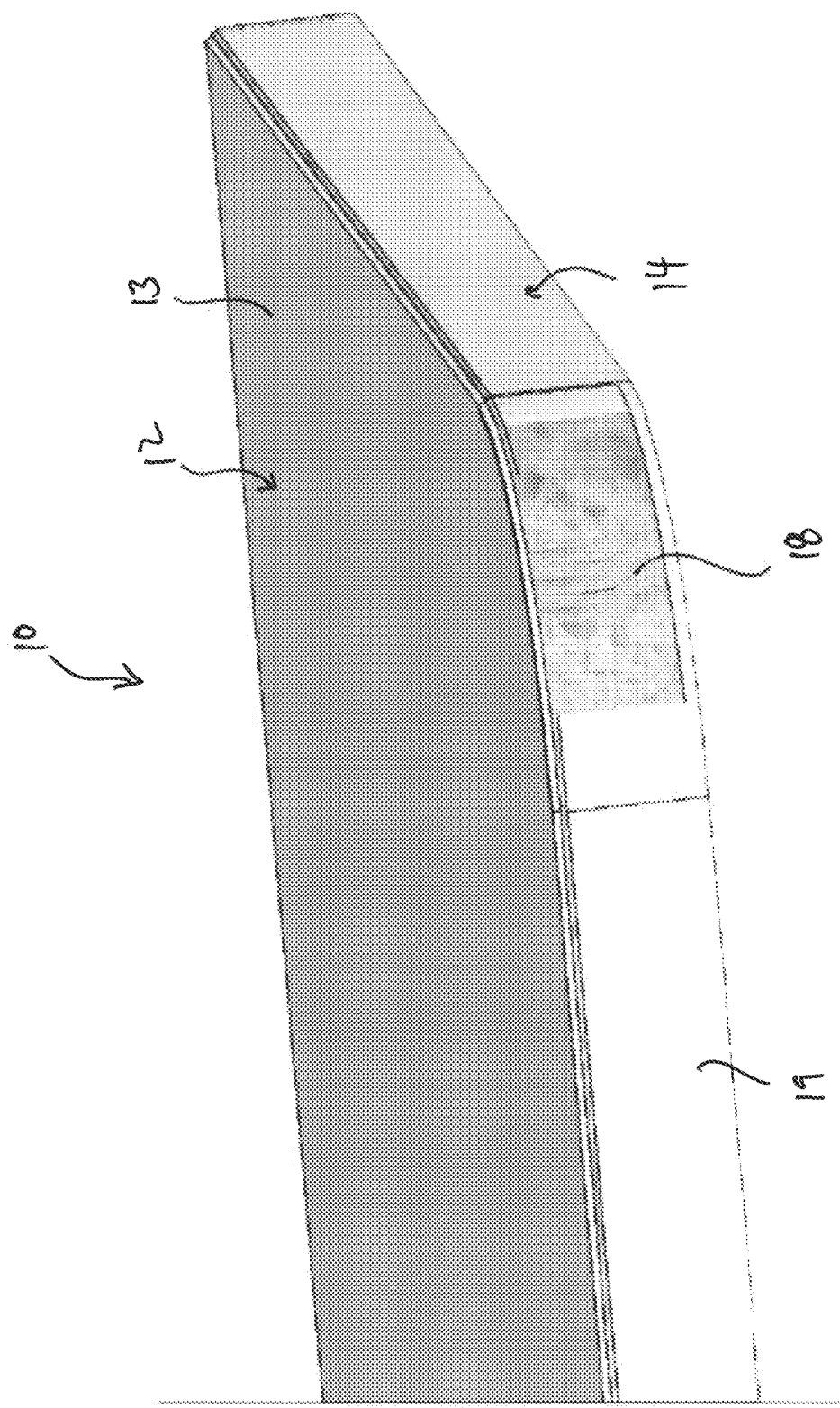
FIG. 8 is an enlarged, detail view of the cut-away section of the cover, showing the foam interior to the cover.
Figure 9:
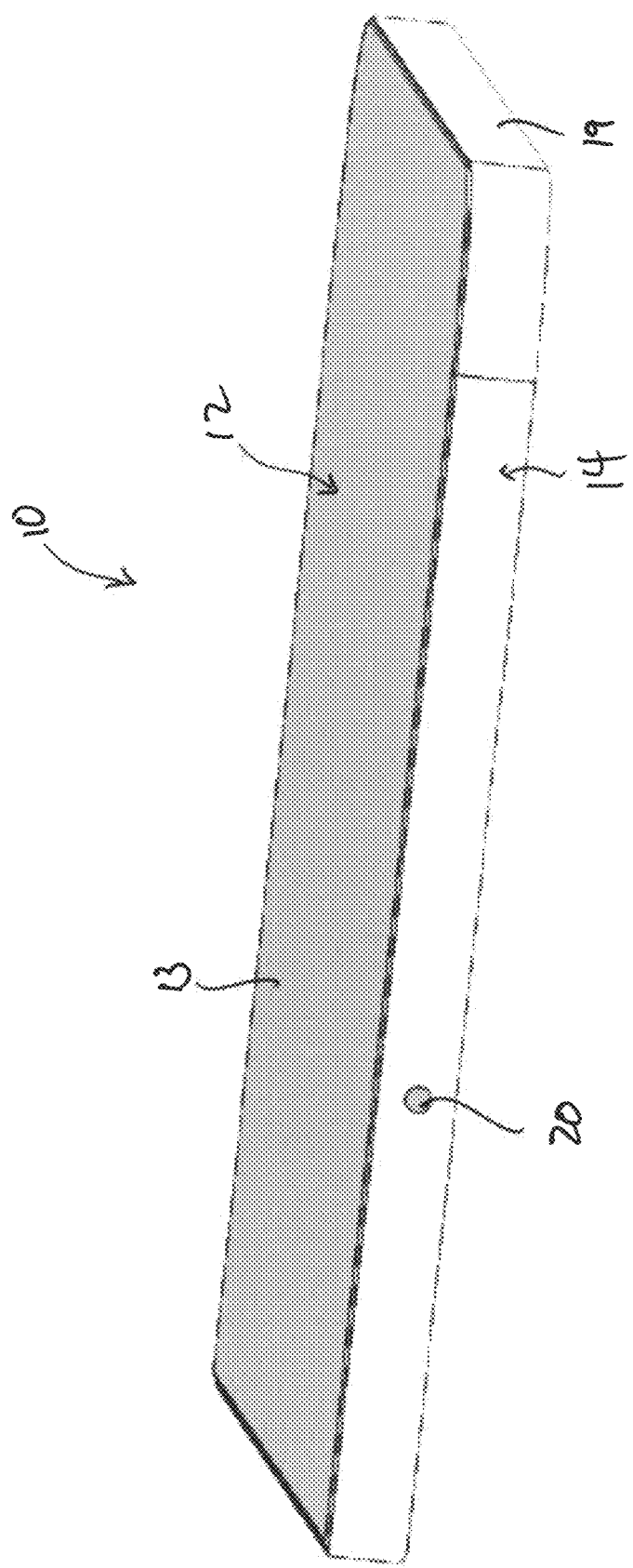

With reference to FIGS. 6-8, once the shell members 12, 14 are joined together, a foam 18 is injected or otherwise filled into the hollow cavity such as through an injection port or like opening (not shown) in the outer surface or peripheral sidewall of the shell members 12, 14. In the preferred embodiment, the foam 18 is a polyurethane foam. In other embodiments, the foam may be expanded polystyrene foam. In certain embodiments, a foam formed from other materials may also be utilized without departing from the broader aspects of the present invention.

Importantly, the foam 18 creates a bond with the vacuum formed shell members 12, 14. As a result, the shell members 12, 14 and foam 18 form a unitary, structural part. As will be readily appreciated, this bonding of the foam 18 to the shell members 12, 14 provides for increased structural rigidity and strength for the cover assembly 10 as a whole, obviating the need to utilize kiss-offs, ribs or other structural members within the cover that are typically more costly and time consuming to manufacture, and which can degrade the thermal efficiency of the cover. This is also in contrast to existing covers that utilize a free-floating foam within the cover (i.e., it does not create a bond with the interior surfaces of the shell members, which adds no structural rigidity or strength to the cover.

In an embodiment, the foam 18 may be a high density foam, meaning a foam having a density in excess of 1.7 lb/ft3. Such high density foam (defining a collapsed cell foam) will not absorb water, even if a breach in one of the shell members 12, 14 occurs. As a result, absorption of water and subsequent loss of strength and insulative properties, mold growth and the like, which have been known to plague existing polystyrene covers, can be obviated by the present invention.

While the embodiments described above disclose the filling of the cavity of with the foam after the shell member 12, 14 are brought into registration with one another, the present invention likewise contemplates that the foam may be deposited or located within one of the shell members 12, 14 prior to bringing the shell members together and sealing the shell members to one another. For example, in an embodiment, foam may be deposited into bottom shell member 14, and then top shell member 12 may be brought into registration with the bottom shell member 14 and sealed thereto along the edges, and with the foam, in the manner discussed above.

Importantly, manufacturing the respective shell members 12, 14 using a vacuum molding process allows for covers in a wide range of shapes, sizes, colors and the like to be quickly, easily and inexpensively produced. In particular, vacuum molds can be made and adjusted inexpensively compared to rotational molds and blow molds which have been typically utilized in the industry. This provides the ability to produce covers of any size to fit any size spa produced. In addition, vacuum molding allows such covers to be produced in a rapid manner, so that after-market cover production is possible without having to produce hundreds of different stock keeping units (skus) and thousands of covers in inventory. Indeed, the method of the present invention allows hard covers for spas to be produced on demand, as sales warrant (i.e., just-in-time manufacturing).

Further to the above, vacuum molding using acrylic allows for the subsequent injection of a polyurethane foam that bonds to the surrounding acrylic shell halves to create an integral structural part. This simply cannot be achieved with rotational molding and other molding methods which cannot use acrylics. Importantly, it is the combination of the acrylic, vacuum formed shell and the polyurethane, high-density or similar foam that enables the foam to bond to the shell to create an integral, structural part that is capable of supporting substantial load.

Figure 9:
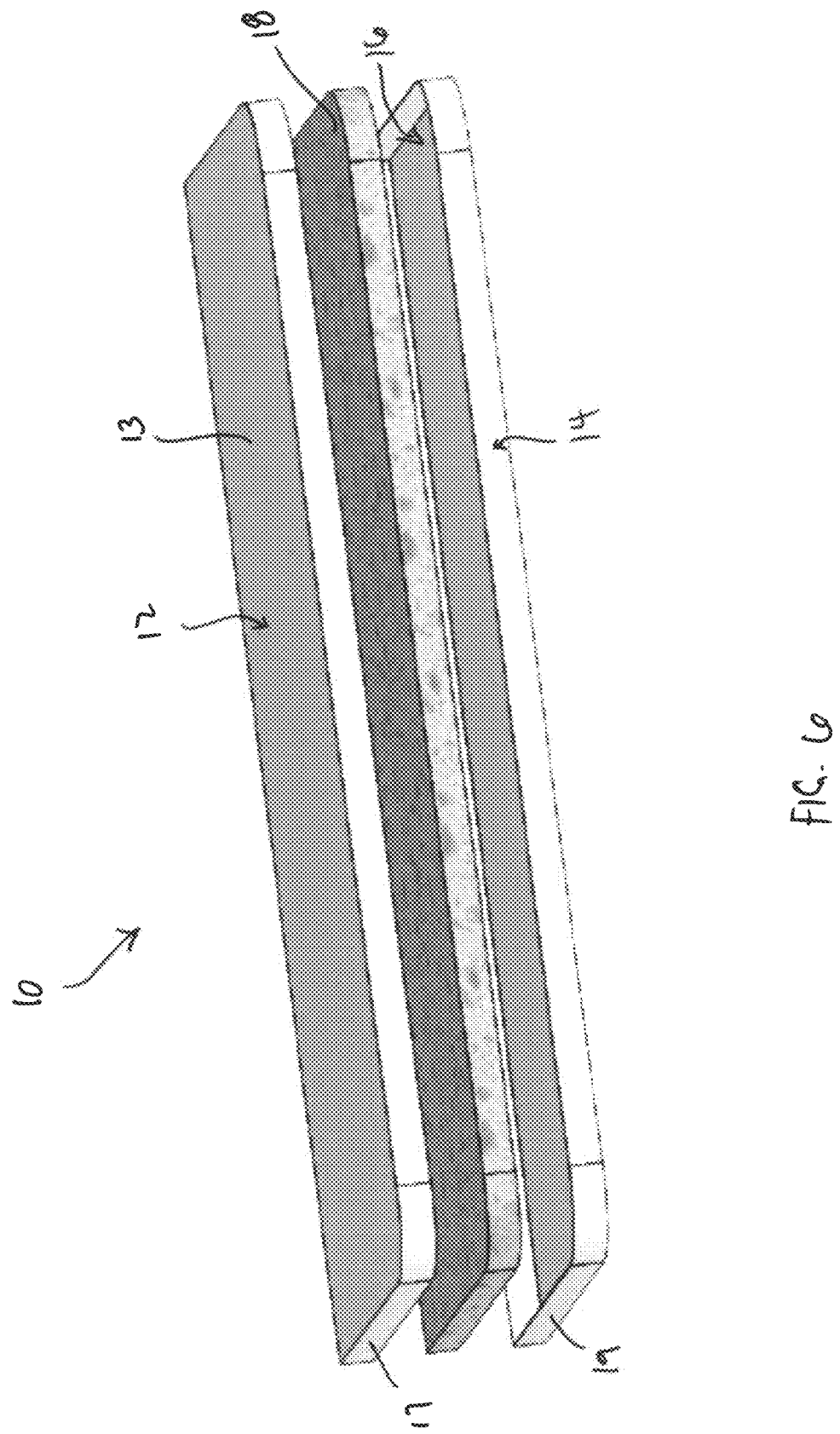
FIG. 9 is a perspective view of a cover showing a lifting aperture or channel formed therein.
Figure 10:
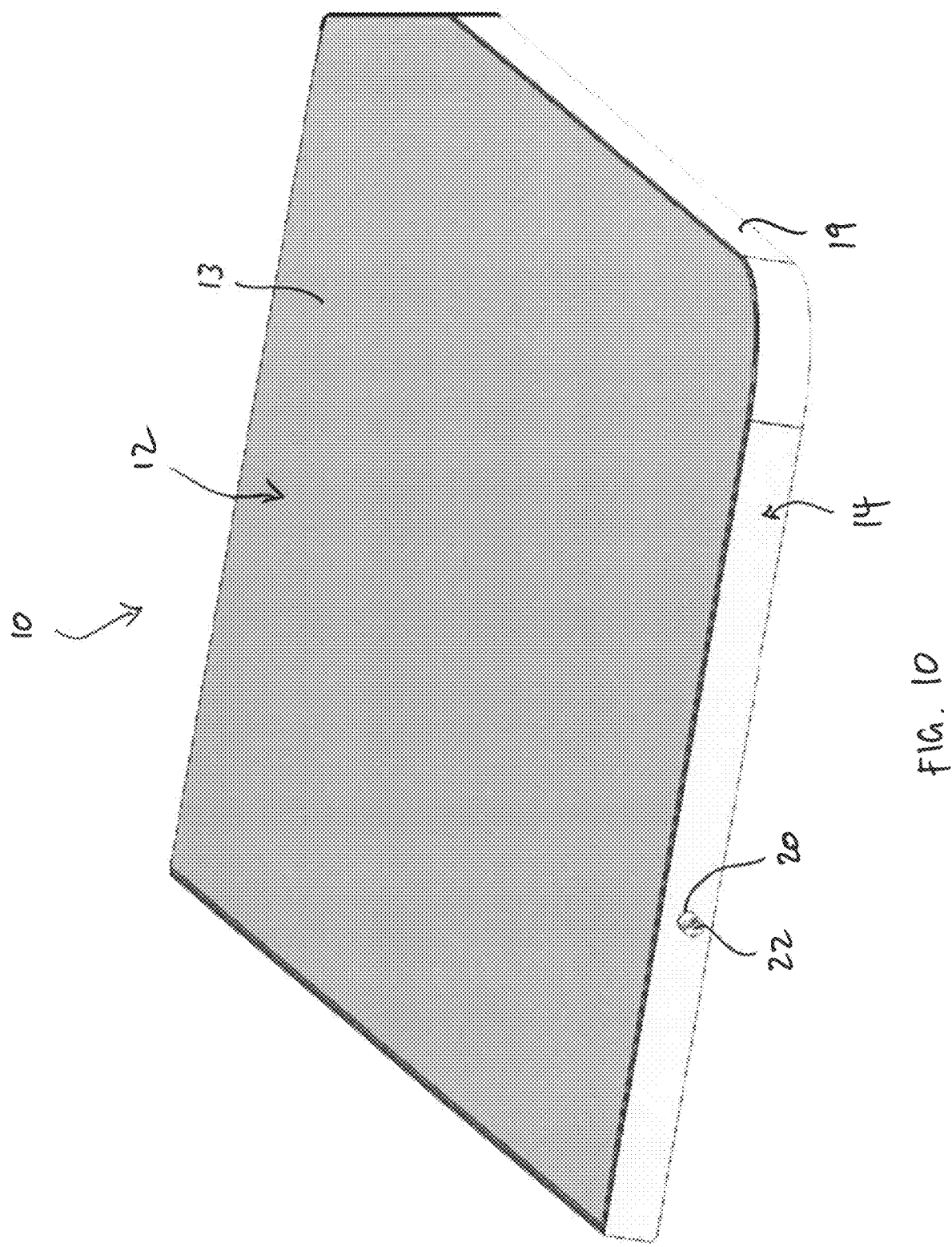
FIG. 10 is a perspective view of the cover of FIG. 9, showing a pipe extending through the lifting channel in the cover.
Figure 11:
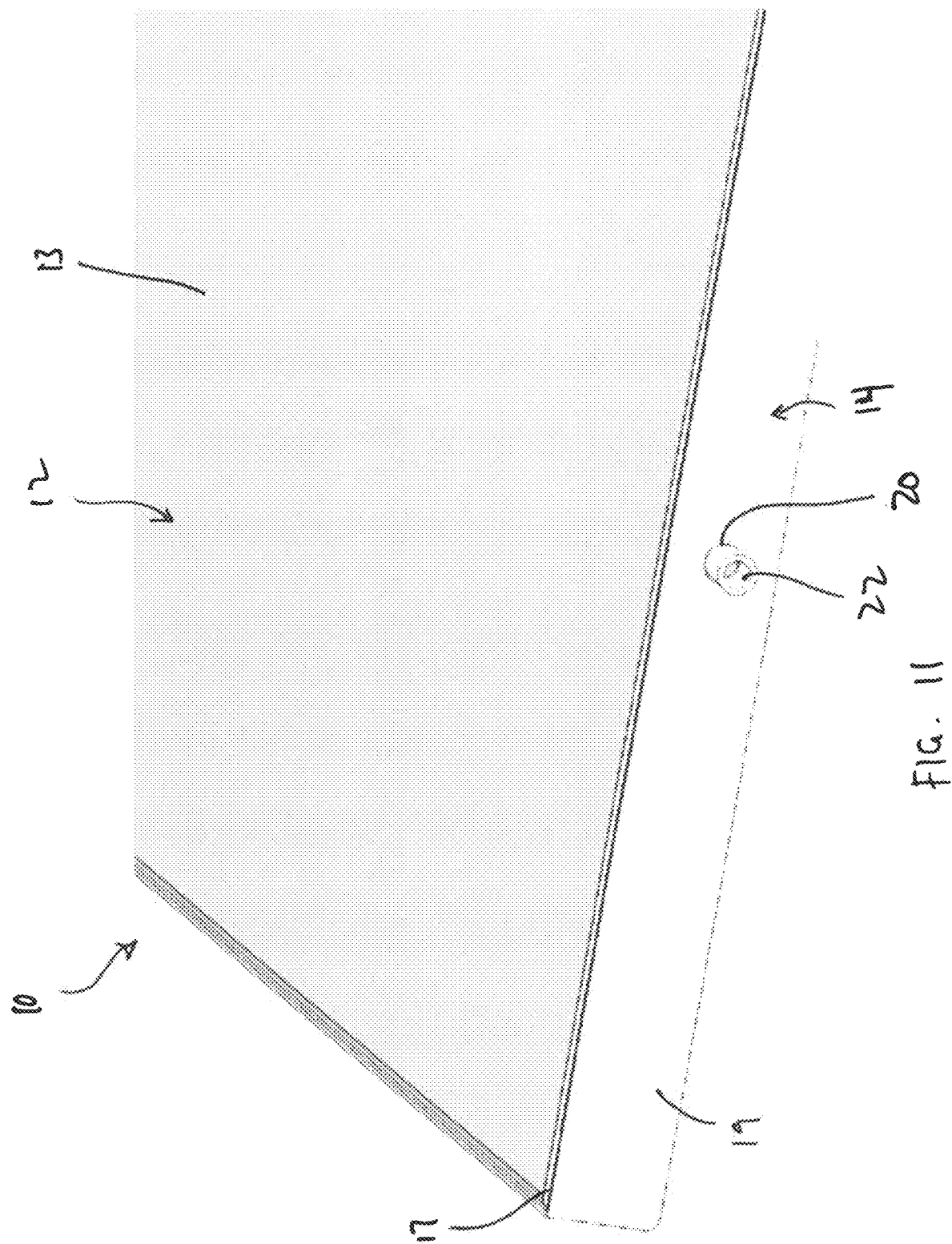
FIG. 11 is an enlarged, perspective view of the cover of FIG. 10.

Referring now to FIGS. 9-12, in an embodiment, the cover assembly 10 may also include a variety of specific configurations that facilitate opening and closing of the cover. For example, in an embodiment, the cover assembly 10 may be manufactured devoid of any apertures or channels for accommodating a lifting mechanism or handle. In another embodiment, as shown in FIG. 9, the cover assembly 10 may be formed with a hole or channel 20 in the side thereof through which a lifting rod (not shown) may be inserted. As shown in FIGS. 10 and 11, the cover assembly 10 may alternatively be formed with the hole 20 and a pipe 22 (e.g., a PVC pipe) extending therethrough. In this embodiment, the pipe 22 is preferably sealed to the cover to prevent the incursion of water, and the pipe 22 is configured to receive a lifting rod of a lifting mechanism therethrough.

Figure 12:
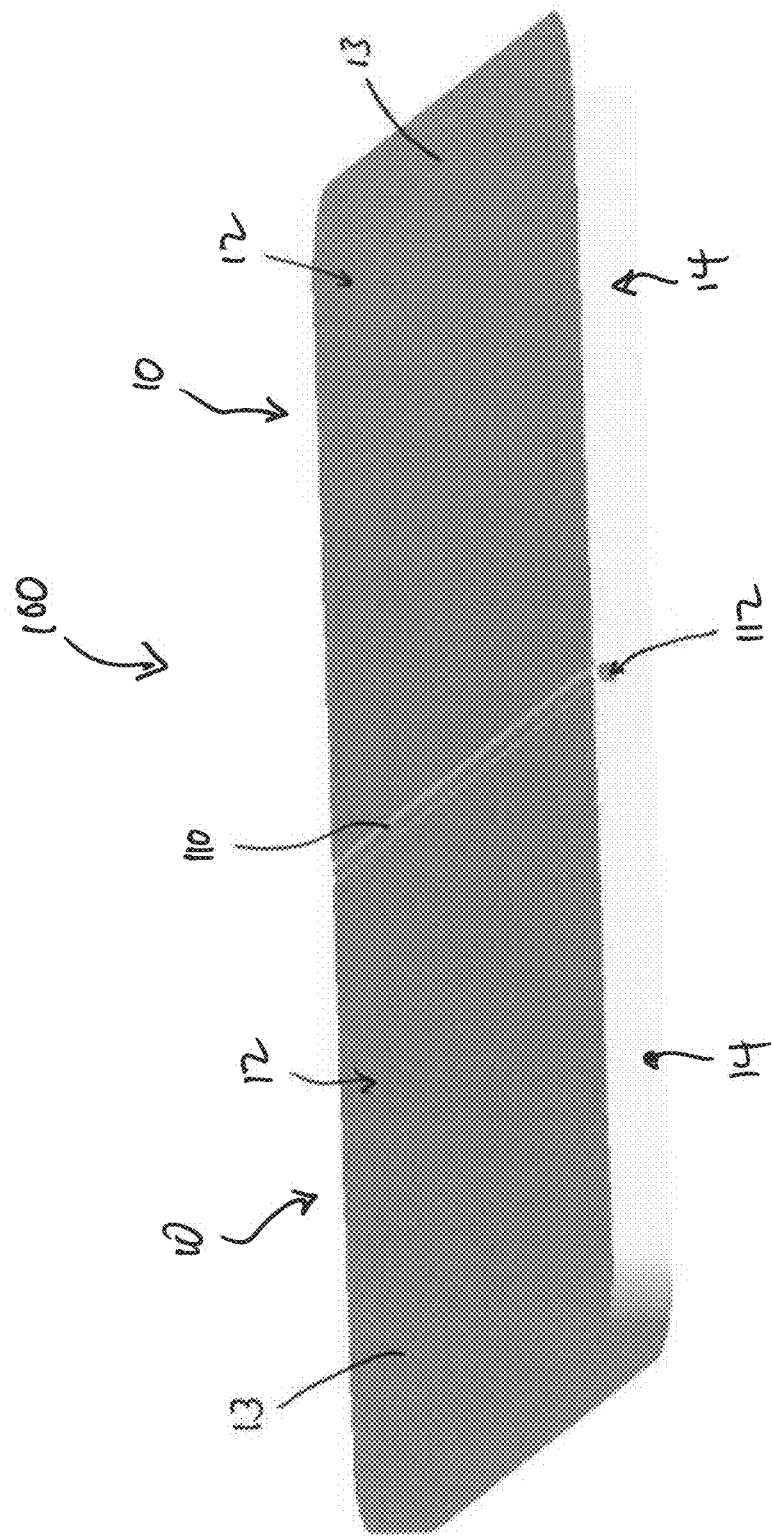
FIG. 12 is a perspective view of a cover assembly having two cover member halves.
Figure 13:
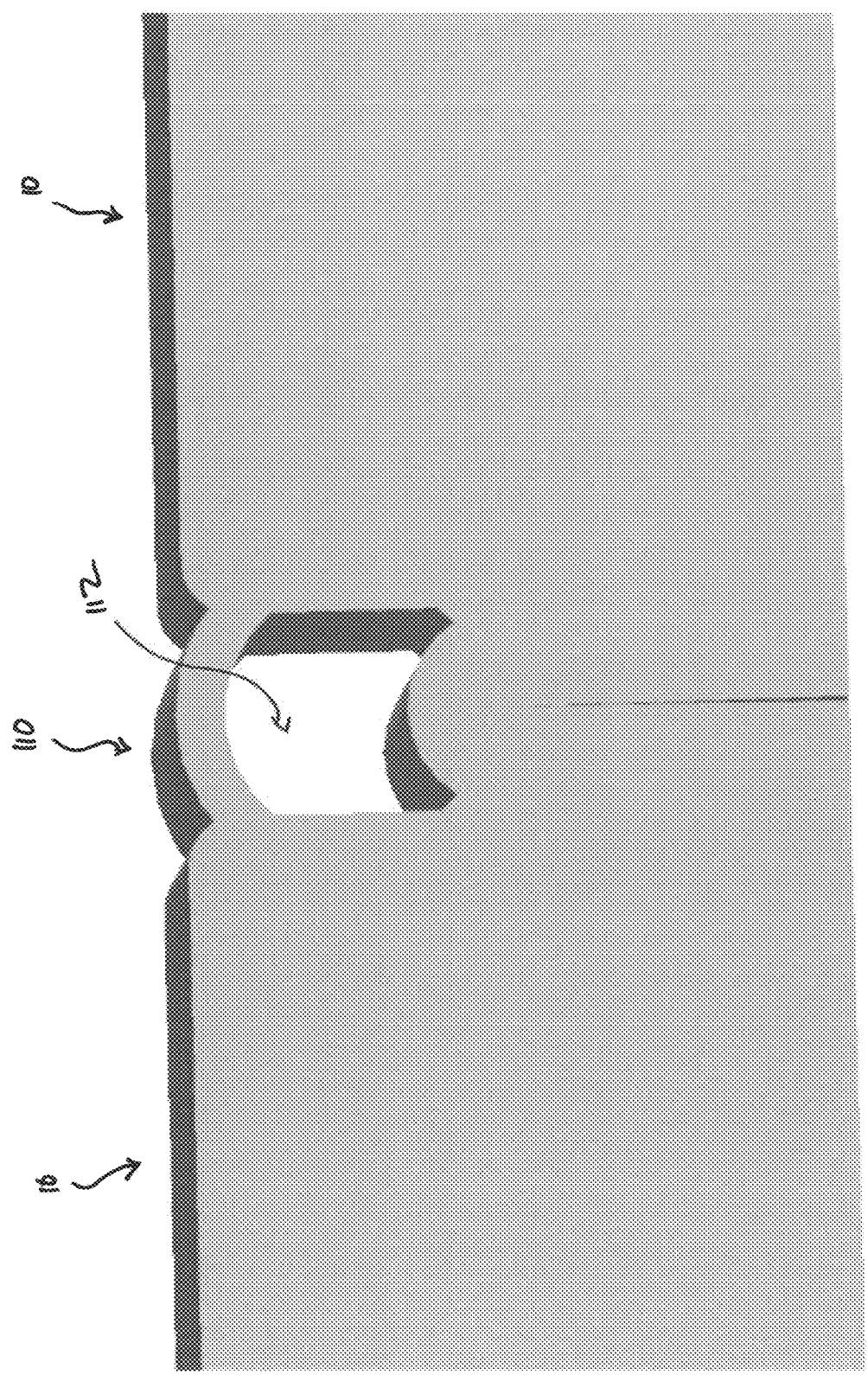
FIG. 13 is an enlarged, perspective view of the cover assembly of FIG. 12, illustrating a seal and lift channel thereof.
Figure 14:
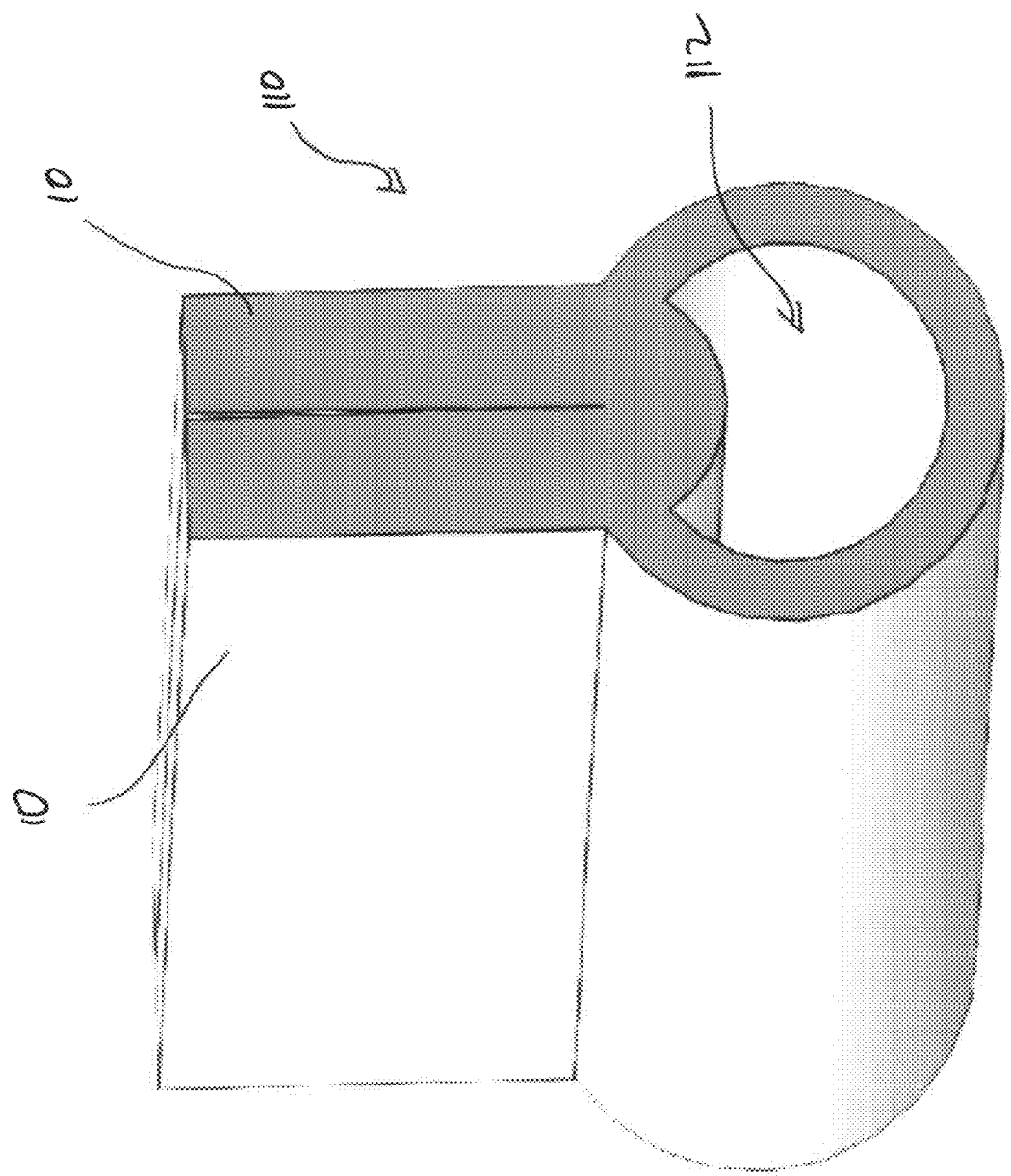
FIG. 14 is an enlarged, perspective view of the seal and lift channel.
Figure 15:
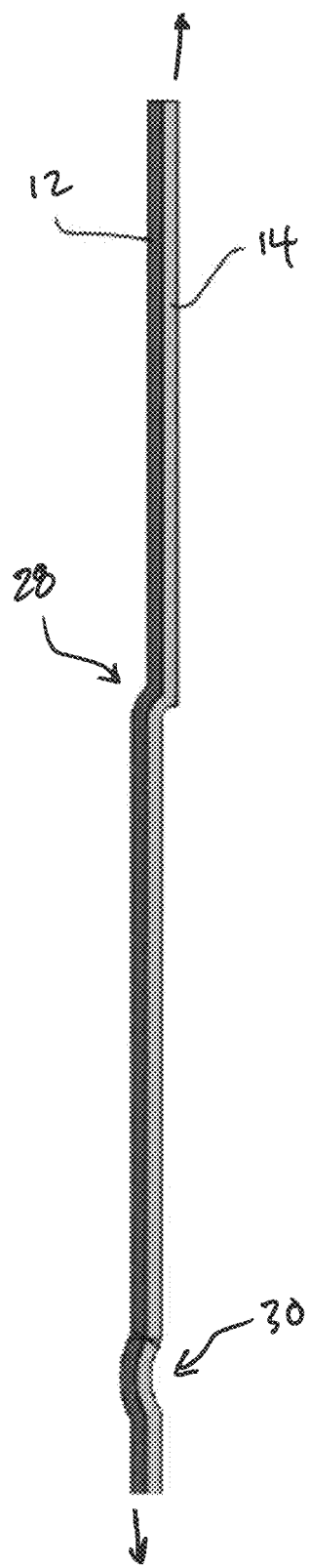
FIG. 15 is a detail, cross-sectional view top and bottom halves of a cover, illustrating locking features thereof.

With reference to FIG. 12, a cover assembly 100 may alternatively include a central seal 110 that joins two opposed cover halves 10. The seal 110 doubles as a lift hole 112 for a lifting rod of a lifting mechanism. As illustrated in FIG. 12, two cover assemblies 10 may be joined together by the seal 110 to form cover 100 that covers the entire spa. In an embodiment, the seal 110 may be joined to the cover halves through an adhesive, welding or other bonding means known in the art. As best shown in FIG. 13, this seal 110 forms a channel 112 running the width of the cover 100 through which a lifting rod may be inserted. During an uncovering operation, the cover 100 is folded upon itself and then lifted by the lifting rod from atop the spa. FIG. 14 illustrates a simplified view of the central seal 110 and channel 112.

Figure 16:
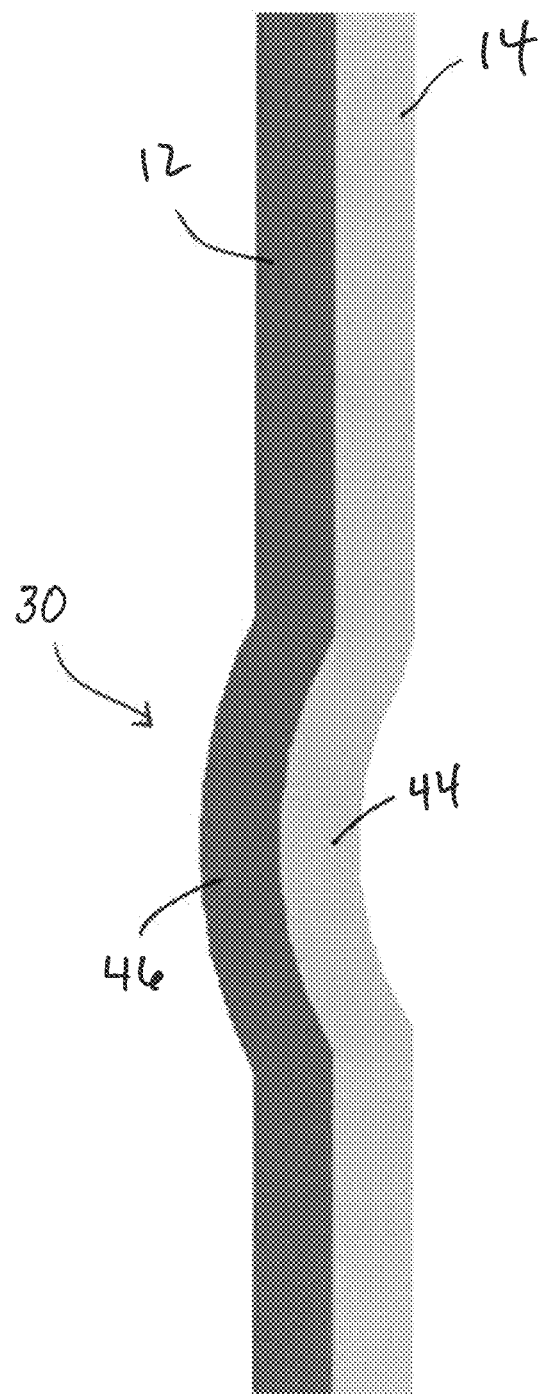
FIG. 16 is an enlarged view of a first locking feature of the cover.
Figure 17:
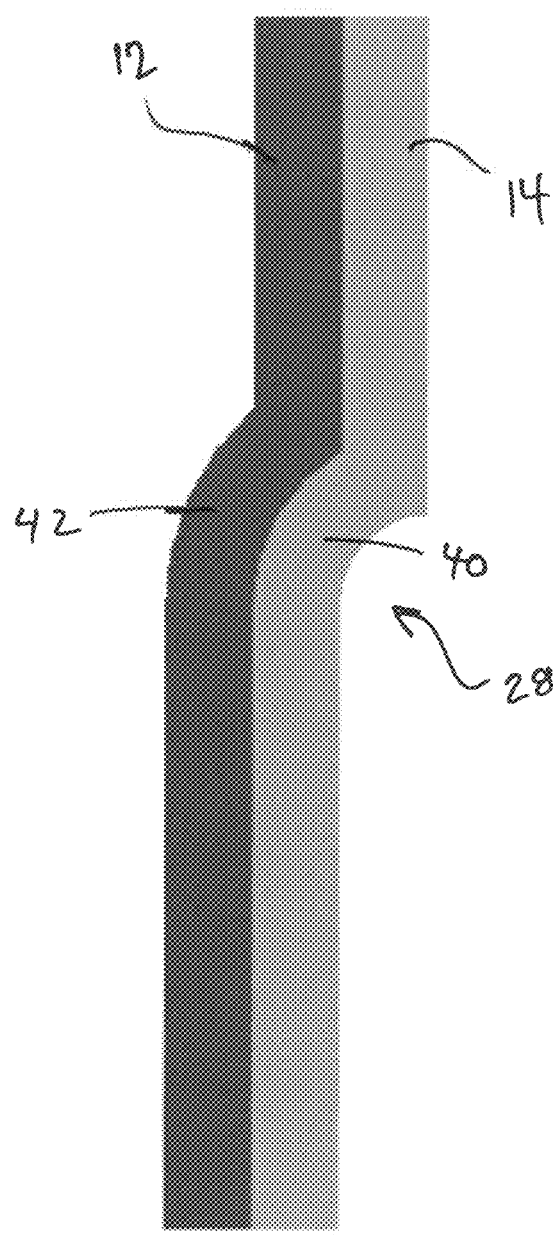
FIG. 17 is an enlarged view of a second locking feature of the cover.
Figure 18:
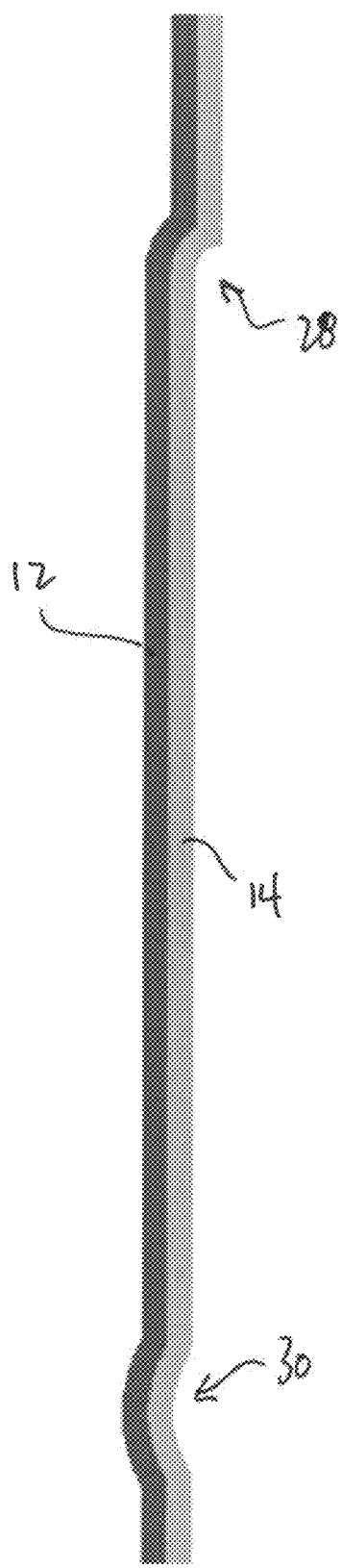
FIG. 18 is a cross-sectional view of the cover showing the outer wall in locked position.

Turning now to FIGS. 15-19, a manner in which the two vacuum formed halves 12, 14 of the cover assembly 10 can be joined together is illustrated. As shown therein, each of the shell members 12, 14 (and in particular, the sidewalls 17, 19 of the shell members 12, 14) may be formed with one or more cooperative locking features or joints, such as a first joint/locking feature 28 and a second joint/locking feature 30. As best shown in FIGS. 16 and 17, the first and second joints 28, 30 may be formed as bends or projections within the shell members 12, 14. For example, as illustrated in FIGS. 16 and 17, the first joint 28 may be formed as cooperative bends 40, 42 (e.g., male and female) in the first and second shell members 12, 14, while the second joint may be formed as cooperative dimples or arcuate projections 44, 46 (e.g., male and female) in the first and second shell members 12, 14. The bends/projections 28, 30 are preferably formed in the shell members 12, 14 as part of the vacuum molding process.

Importantly, the slight resiliency of the shell members 12, 14 permits then to slide into nesting arrangement with one another rather easily. When the foam 18 is injected into the hollow cavity after the shell members 12, 14 are joined together, however, the foam expands, causing the joints/locking features 28, 30 in the respective shell members 12, 14 to lock together, thereby mechanically preventing the shell from sliding apart. In particular, the shell members 12, 14 are prevented from sliding or moving relative to one another in the direction of the arrows shown in FIG. 15 (and in any direction) because of the cooperative locking features 28, 30 (i.e., the male projection or dimple is received in the corresponding female recess. This feature, in concert with the adhesive or welding along the joint interface, forms a lasting and impenetrable seal, impervious to water.

Figure 19:
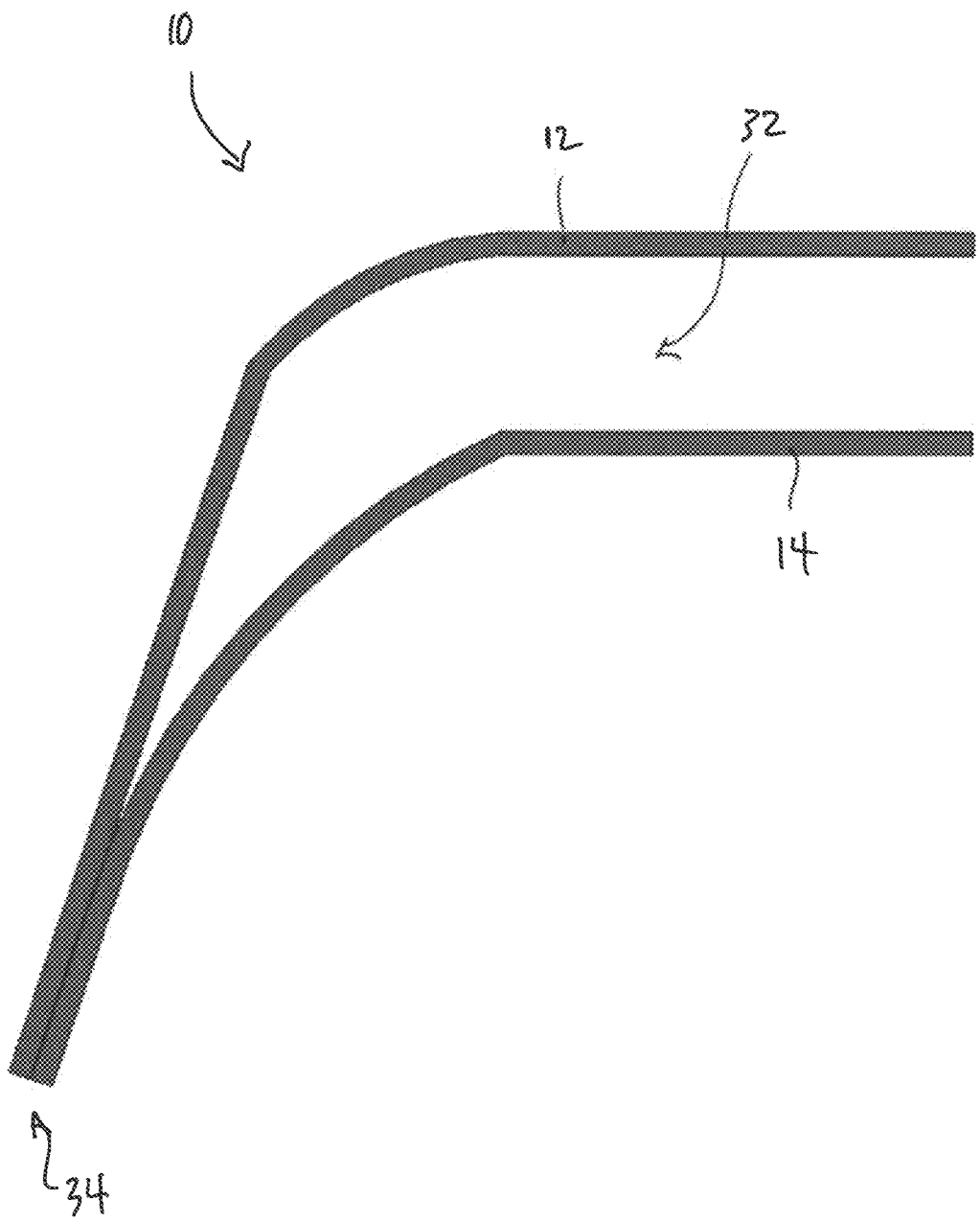
FIG. 19 is an enlarged, cross-sectional view of a portion of a cover, illustrating the joining of the two halves thereof.

With reference to FIG. 19, the hollow cavity 32 of the cover assembly 10 may also be formed by nesting the two shell members 12, 14 into each other, as shown. The halves 12, 14 can then be easily glued or thermally joined at joint 34. In addition, as illustrated in FIG. 19, utilizing this process, the joined ends (i.e., at 34) can be molded or shaped to form a skirt that closes registers with the shell or sides of the spa. This can potentially obviate the need to utilize a separate vinyl or plastic skirt around the periphery of the spa, decreasing costs overall, and improving aesthetics of the spa, as a whole.

In addition to the above, by vacuum forming the respective shell members 12, 14 using the materials mentioned above, the color of the cover assembly 10 can be easily changed, many different patterns are possible, and a much smoother and glossier finish can be achieved as compared to existing methods. In connection with this, the method and resulting cover assembly of the present invention allows for images to be adhered to the cover assembly (which has heretofore not been possible due to the rough finish of existing hard covers). In some embodiments, the finish provided by the vacuum molding process also allows for painting of the molded cover to provide an even more customized and finished look. Moreover, by utilizing a vacuum molding process, raised or sunken in reliefs may be molded into the cover assembly to create unique designs, words, phrases and the like.

While the embodiments described above contemplate the injection of polyurethane foam into the hollow interior cavity after the halves are joined together, preformed or precut foam inserts may also be utilized. In particular, in an embodiment, a preformed foam insert that closely matches the interior shape and size of the shell members may be placed inside the hollow cavity and an adhesive utilized to bond the insert to the respective shell halves as the halves are brought together to enclose the insert. In yet other embodiments, liquid polyurethane may be poured into the hollow cavity, or Styrofoam pellets blown into the hollow cavity, to form the foam interior.

While the present invention has been described above in connection with the manufacture of a cover for a spa, the invention is not so limited in this regard. In particular, it is envisioned that the method described above may also be utilized to provide various other articles of manufacture where a foam may be utilized to provide interior strengthening and rigidity for a hollow article by bonding with the interior surfaces of such article. For example, various other spa parts may be manufactured by the process described herein including, but not limited to, spa bases, spa doors and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cover for a spa, comprising:
a first shell member;
a second shell member nested with the first shell member and defining an interior space therebetween;
a foam within the interior space bonded with the first shell member and the second shell member; and
at least one cooperative locking feature integral with the first shell member and the second shell member, the cooperative locking feature providing a mechanical mechanism to inhibit decoupling of the first shell member from the second shell member;
wherein the cooperative locking feature includes a male locking feature forming part of the first shell member and a female locking feature forming part of the second shell member;
wherein the male locking feature of the first shell member is received by the female locking feature of the second shell member; and
wherein the foam is configured to bias the male locking feature into engagement with the female locking feature and to hold the male locking feature in engagement with the female locking feature.

2. The cover of claim 1, wherein:
the first shell member and the second shell member are formed from an acrylic material.

3. The cover of claim 2, wherein:
the acrylic material is one of acrylonitrile butadiene styrene and polyvinyl chloride.

4. The cover of claim 1, wherein:
the first shell member and the second shell member are formed from polyethylene.

5. The cover of claim 3, wherein:
the foam is a polyurethane foam.

6. The cover of claim 5, wherein:
the foam is a closed-cell foam having a density in excess of 1.7 lb/ft3.

7. The cover of claim 2, wherein:
the first shell member and the second shell member are vacuum formed.

8. A cover for a spa, comprising:
a first shell member;
a second shell member nested with the first shell member and defining an interior space therebetween;
a foam within the interior space; and
at least one cooperative locking feature integral with the first shell member and the second shell member, the cooperative locking feature providing a mechanical mechanism to inhibit decoupling of the first shell member from the second shell member;
wherein the cooperative locking feature includes a male locking feature forming part of the first shell member and a female locking feature forming part of the second shell member;
wherein the male locking feature of the first shell member is received by the female locking feature of the second shell member; and
wherein the foam is configured to bias the male locking feature into engagement with the female locking feature and to hold the male locking feature in engagement with the female locking feature.

9. The cover of claim 1, further comprising:
an aperture in at least one of the first shell member and the second shell member, the aperture providing for fluid communication with the interior space for injecting the foam into the interior space.

* * * * *